United States Patent
Li et al.

(10) Patent No.: US 11,718,223 B2
(45) Date of Patent: Aug. 8, 2023

(54) GLASS PANEL ASSEMBLY FOR A ROOF OF A VEHICLE

(71) Applicant: Inalfa Roof Systems Group B.V., Oostrum (NL)

(72) Inventors: Jiangtao Li, Shanghai (CN); Jur Johannes Maria Custers, Lottum (NL); Eduardus Christianus Henricus Van Boxtel, Zeeland (NL); Marcel Johan Christiaan Nellen, Merselo (NL); Robert Rikkert, Nuenen (NL); Robbert Arij Jeroen De Jong, Panningen (NL); Sander De Bie, Nuth (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 118 days.

(21) Appl. No.: 17/357,726

(22) Filed: Jun. 24, 2021

(65) Prior Publication Data

US 2021/0316655 A1    Oct. 14, 2021

Related U.S. Application Data

(63) Continuation of application No. 16/883,527, filed on May 26, 2020, now abandoned.

(30) Foreign Application Priority Data

May 27, 2019   (CN) .......................... 201920766381.2
Oct. 10, 2019  (EP) ...................................... 1902408

(51) Int. Cl.
*B60J 7/043*   (2006.01)
*B60Q 3/208*   (2017.01)
(Continued)

(52) U.S. Cl.
CPC .............. *B60Q 3/208* (2017.02); *B60J 7/043* (2013.01); *B60Q 3/51* (2017.02); *B60Q 3/56* (2017.02); *B60Q 3/62* (2017.02); *B60Q 3/88* (2017.02)

(58) Field of Classification Search
CPC . B60Q 3/208; B60Q 3/51; B60Q 3/62; B60Q 3/64; B60Q 3/74; B60J 7/043
(Continued)

(56) References Cited

U.S. PATENT DOCUMENTS 6,036,259 A * 3/2000 Hertel .................... B60J 7/0573
                                                 174/117 F
6,338,526 B1   1/2002 Jardin
(Continued)

FOREIGN PATENT DOCUMENTS

CN    209719405 U    12/2019
DE    10033775 A1    1/2002
(Continued)

OTHER PUBLICATIONS

European Search Report dated Mar. 18, 2020, for corresponding European Patent Application No. 19202408.1.
(Continued)

*Primary Examiner* — Dennis H Pedder
(74) *Attorney, Agent, or Firm* — Steven M. Koehler; Westman, Champlin & Koehler, P.A.

(57) ABSTRACT

A glass panel assembly for use in a roof of a vehicle, comprises a glass panel, a frame and an elongate lighting device. The glass panel comprises an interior main surface and the interior main surface of the glass panel is configured to be directed to a passenger compartment of the vehicle. The frame is adhered to the interior main surface and comprises a shaped element. The shaped element is one of a recess and a protrusion. The elongate lighting device is (Continued)

coupled to the frame by a mating shape engaging the shaped element. The lighting device is configured to directly illuminate at least a part of said passenger compartment.

18 Claims, 5 Drawing Sheets

(51) Int. Cl.
    *B60Q 3/62*     (2017.01)
    *B60Q 3/88*     (2017.01)
    *B60Q 3/56*     (2017.01)
    *B60Q 3/51*     (2017.01)

(58) Field of Classification Search
    USPC ....... 296/211, 216.06, 216.09, 215; 362/490, 362/495
    See application file for complete search history.

(56) References Cited

U.S. PATENT DOCUMENTS

| | | | |
|---|---|---|---|
| 6,666,571 B2 * | 12/2003 | Becher | B60Q 3/208 362/490 |
| 6,867,893 B2 | 3/2005 | Patz et al. | |
| 2003/0026105 A1 | 2/2003 | Becher et al. | |
| 2003/0129416 A1 | 7/2003 | Patz et al. | |
| 2013/0214562 A1 | 8/2013 | Uehara | |
| 2019/0047388 A1 | 2/2019 | Hammer | |
| 2019/0176693 A1 | 6/2019 | Park et al. | |
| 2020/0254858 A1 | 8/2020 | Kleo | |

FOREIGN PATENT DOCUMENTS

| | | | | |
|---|---|---|---|---|
| DE | 10204359 A1 * | 10/2002 | ............. | B60Q 3/001 |
| DE | 102010023811 A1 | 12/2011 | | |
| EP | 1277616 A1 | 1/2003 | | |
| EP | 1310823 A1 | 5/2003 | | |
| EP | 2287042 A1 | 2/2011 | | |
| EP | 3245083 B1 * | 1/2021 | ....... | B32B 17/10018 |
| WO | 2011007070 A1 | 1/2011 | | |

OTHER PUBLICATIONS

European Office Action in corresponding European Patent Application No. 20176654.0 dated Nov. 5, 2021.

* cited by examiner

GLASS PANEL ASSEMBLY FOR A ROOF OF A VEHICLE

BACKGROUND

The discussion below is merely provided for general background information and is not intended to be used as an aid in determining the scope of the claimed subject matter.

The invention relates to a glass panel assembly for a vehicle roof and to a method for manufacturing such a glass panel assembly. In particular, the invention relates to providing a lighting device on the glass panel assembly.

Glass panels for use in a vehicle roof are commonly known. For example, a glass plate-like closure member may be moveably provided over an opening in the vehicle roof. The closure member may be tilted to provide for a tilted position, e.g. suitable for ventilation purposes, wherein a rear side edge portion of the closure member is tilted out of a plane of the vehicle roof. From the tilted position, the closure member may be slid over another part of the vehicle roof, uncovering the opening in the roof.

It is known to provide a lighting element in such a glass panel assembly. For example, it is known to provide a light guide in a frame part such as a guide frame of a sunshade. Further, it is known to provide light in a light conductive layer of a layered glass panel, wherein the light is then spread in such light conductive layer and is coupled out into a passenger compartment of the vehicle by a patterned structure provided on a surface of the light conductive layer.

While the above-mentioned known lighting solutions may provide for a suitable interior lighting effect, these known solutions may be undesirable. For example, with a light conductive layer it may proof relatively difficult and complex to achieve a uniform light spread, while the use of a light guide in a frame part requires additional space.

Another known solution embeds a light conductive part, e.g. a light guide, in a foamed or injection-moulded backing on a glass panel, while a cavity is provided in the backing for mounting a light source. Such an arrangement may be cost-effective and simple. Such embedding of the light conductive part in the backing requires to apply the backing on or over the light conductive part. During such embedding a surface of the light conductive part is easily damaged. Any damage to a surface of the light conductive part however will negatively affect the light out-coupling and thus the appearance of the light in the vehicle passenger compartment. Moreover, the appearance and finish of the backing may be difficult to control with such a sensitive part present, thus requiring expensive and safe finish treatment during manufacturing.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A glass panel assembly comprises a glass panel, a frame and an elongate lighting device. The glass panel comprises an interior main surface, which interior main surface is configured to be directed to a passenger compartment of the vehicle. The frame is adhered to the interior main surface and comprises a shaped element. The shaped element is one of a recess and a protrusion. The elongate lighting device is mechanically retained and held in position at the frame by a mating shape engaging the shaped element. Further, the lighting device is configured to directly illuminate at least a part of the passenger compartment of the vehicle.

In accordance with an inventive concept of the present invention, the lighting device is mounted on the frame, such as a foamed or injection-moulded backing, by engaging a mating shape of the lighting device with a shaped element of the frame. So, as used herein, a frame is not required to support the glass panel. The term 'frame' is intended to refer to any kind of structure adhered to the glass panel. Of course, the frame may be intended and configured to support the glass panel or to increase rigidity of the glass panel, but the frame may as well only have an aesthetic function or a protective function, for example. The lighting device thus is mounted on the interior main surface of the glass panel, requiring only a small height, i.e. space. If the glass panel is moveably arranged, the lighting device moves with the glass panel.

The frame is separately applied and adhered on the glass panel. The adherence of the frame may be achieved directly or indirectly. For example, if the frame comprises a rigid support element, like a metal or plastic element, the rigid support element may be indirectly adhered by use of an adhesive. If the frame is at least partially formed by a cured polymer-based composition, like a foamed or injection-moulded backing, the frame may be formed on the glass panel as known in the art, thereby directly adhering to the glass panel. In another embodiment, the frame may be formed by a rigid support element embedded in the cured polymer-based composition, wherein the cured, polymer-based composition may be used for adhering the rigid support element to the glass panel or the rigid support may be first adhered to the glass panel and then embedded in the polymer-based composition upon application of the polymer-based composition.

By providing a suitably shaped element on or in the frame, the elongate lighting device may be easily mechanically coupled to the interior main surface of the glass panel by use of the mating shape. The shaped element and the mating shape provide for a mechanical coupling for holding the mating shape in position, e.g. by a clamping force or any other mechanical retaining force using e.g. a clipping arrangement or a form-fitting arrangement. The mating shape is coupled to the shaped element after the shaped element has been formed. The mating shape and the shaped element may be coupled to each other by application of a pressing/pushing force, whereby flexibility of one or both of the shaped element and the mating shape results in a fitting of the shaped element and the mating shape. When fitted, a mechanically retaining force keeps the shaped element and the mating shape in position. Still, in an embodiment, the mating shape may be detachably held by the shaped element. For example, applying a large force exceeding a force exerted under normal operational conditions may result in a release of the mating shape from the shaped element, depending on the shapes of the shaped element and the mating shape.

The mating shape may be the shape of an optical element comprised in the lighting device or the mating shape may be the shape of a dedicated part of the lighting device. The shaped element and the mating shape have such a shape that when they are in engagement, the lighting device is sufficiently fixed in position and the shape and the mating shape remain in their mutual relative position under normal operational conditions, e.g. driving conditions of the vehicle, as above described. For example, a form-fitting arrangement may be applied or a high friction between the shaped element and the mating shape (i.e. clamping) may be provided. Any other suitable shape providing resistance to movement between the frame and the lighting device may be applied equally well. A person skilled in the art will readily understand the possibilities for providing a suitable shape for the shaped element and a corresponding shape for the mating shape.

Thus, the sensitive optical elements of the lighting device are prevented from being subjected to potentially damaging manufacturing steps. The frame is first adhered to the glass panel and, in a later step, the lighting device is easily coupled to the frame.

The lighting device is arranged and configured to directly illuminate at least a part of the passenger compartment of the vehicle. The passenger compartment of the vehicle is an interior space of the vehicle, which interior space is configured and intended for accommodating a driver or any passengers, excluding any recesses or spaces that are, on the one hand, in open contact with such passenger compartment but, on the other hand, are not intended for passengers to access in normal use. Directly illuminate, as used herein, is intended to indicate that a substantial portion of light rays emitted from the lighting device arrives in the passenger compartment for illuminating the passenger compartment. In the words, there are no further elements required or needed, either inside or outside the passenger compartment, for functionally illuminating the passenger compartment such as a reflecting element or any other element to bend light rays into the passenger compartment to prevent a loss of light and to reduce an amount of space needed for the lighting device. Of course, if so desired, the lighting device as used in the present invention may comprise any optically functional element for shaping a bundle of light rays emitted from a light source.

In an embodiment, the rigid support element comprises an elongate recess and the rigid support element is embedded in the cured polymer-based composition such that the elongate recess is open and forms the shaped element of the frame. For example, the rigid support element may be provided with a C-shaped portion in its cross-section, thereby providing an open channel along its length. Embedding the C-shaped portion in the polymer-based composition without covering the opening of the C-shaped portion provides an open recessed channel as a shaped element. A light guide may be arranged in the recessed channel. The opening of the C-shaped portion allows light to leave the open channel and illuminate the part of the passenger compartment of the vehicle.

In accordance with an aspect of the present invention, the shape of the recessed channel is adapted to the lighting device and in particular to the mating shape of the lighting device. For example, the C-shape and mating shape may be mutually adapted to provide for a clamping force. In another example, a retention portion may be provided in the recessed channel such that the mating shape may be pushed through the opening of the C-shaped portion and beyond the retention portion. The retention portion then prevents the mating portion to move back out of the recessed channel. The person skilled in the art readily understands that many other possible shapes are available and suitable for achieving a retention function between the shaped element and the mating shape.

An inner surface of the C-shaped portion may be adapted to support the lighting function and to support the lighting device in its lighting function. For example, if the lighting device comprises a light guide that is to be arranged in the recessed channel formed by the C-shaped portion, the inner surface of the channel may be treated to be reflective such as to reflect any light towards the opening of the channel and thus towards the passenger compartment.

In the above example, a recessed open channel is described. The present invention is however not limited to such embodiment. The rigid support element may as well provide for a local recess, in which a pin-like mating shape may be retained. In another embodiment, the shaped element of the frame may be a protruding pin-like element, wherein the mating shape comprises a recess configured to mate with the pin-like protrusion.

Generically, in an embodiment, the shaped element is elongated and extends along a length direction of at least a part of the frame. This may be achieved using a rigid support element as above described or this may be achieved by selecting a suitable shape of an outer surface of a frame formed by the cured polymer-based composition. For example, an elongate recess, like a recessed open channel, may be provided in the frame along a length direction of at least a part of the frame or an elongated protrusion, such as a protruding rib, may be formed on the frame along a length direction of at least a part of the frame. It is noted that the frame formed by a cured polymer-based composition may easily be provided with many different shapes in or on its surface due to the inherent flexibility in the manufacturing and application of such a frame.

In a particular embodiment, the shaped element is an elongated recess extending between the interior main surface and the frame along a length direction of at least a part of the frame. The shaped element is formed such that the mating shape of the lighting device couples and is retained in an elongate recess formed between the frame and the glass panel. This may be desirable in order to achieve a minimum height for the lighting function. In this embodiment, additional features may be applied. For example, a reflective layer may be applied on the interior main surface of the glass panel in the elongate recess to reflect light towards the passenger compartment of the vehicle.

In an embodiment, the shaped element and the mating shape have a corresponding shape to provide for a form-fitting engagement. As above described, many shapes may be suitable for providing the retaining function. A preferred embodiment may be a form-fitting shape of the shaped element and the mating shape, as apparent to those skilled in the art.

As above described as an exemplary embodiment, the elongate lighting device may comprise an elongate light guide, e.g. having a light source like an LED at an end thereof for providing light in the light guide. In such embodiment of the lighting device, the shaped element may be a recess and the elongate light guide may be clamped in such recess.

In an embodiment, the elongate lighting device comprises a carrier and the carrier comprises a coupling element. The coupling element is provided with the mating shape. The carrier may take many forms. For example, the carrier may comprise a cover and a lighting element, like a light guide, is held in the carrier. The carrier is then provided with the mating shape to couple to the frame and be retained in that position.

In an embodiment, the elongate lighting device comprises an array of light sources and a diffusing element arranged between the array of light sources and the passenger compartment of the vehicle. Instead of a light guide as above mentioned, the lighting device may comprise a flexible or rigid substrate with a number of e.g. LED's (or similar small light sources). To provide for a uniform light distribution, the individual light spots of the individual light sources may be diffused by application of a diffusing element. Still, the present invention is not limited to a lighting device providing a uniform light distribution. So, within the scope of the present invention, individual light spots may be provided as well, if so desired.

In a second aspect, the present invention provides a method of manufacturing a glass panel assembly for use in a roof of a vehicle. The method comprises the steps of providing a glass panel comprising an interior main surface, wherein the interior main surface of the glass panel is configured to be directed to a passenger compartment of the vehicle; adhering a frame to the interior main surface, wherein the frame comprises a shaped element, the shaped element being one of a recess and a protrusion; providing an elongate lighting device, wherein the lighting device comprises a mating shape; and engaging the mating shape of the elongate lighting device with the shaped element to couple the elongate lighting device to the frame such to mount the elongate lighting device on the glass panel. The lighting device is configured to, when mounted, directly illuminate at least a part of said passenger compartment.

In a third aspect of the present invention, an elongate lighting device is provided. The lighting device comprises a carrier and the carrier comprises a coupling element. The coupling element comprises a mating shape, wherein the mating shape is configured to be engaged with a shaped element of a frame of a glass panel assembly for mounting and retaining the elongate lighting device on the interior main surface of the glass panel assembly. Such an elongate lighting device may be separately supplied to a car manufacturer for mounting on the glass panel assembly and may even be separately sold to replace a defective lighting device or to provide for a customizable lighting effect. With the simple and easy coupling and retaining mechanism, the lighting device is indeed easily replaceable to enable customization.

In a fourth aspect, the present invention provides a glass panel assembly for use in a roof of a vehicle, wherein the glass panel assembly comprises a glass panel and a frame. The glass panel comprises an interior main surface, wherein the interior main surface of the glass panel is configured to be directed to a passenger compartment of the vehicle. The frame is adhered to the interior main surface and comprises a shaped element. The shaped element is one of a recess and a protrusion and is configured for engaging a mating shape of an elongate lighting device for mounting the lighting device on the interior main surface, wherein the lighting device is configured to directly illuminate at least a part of said passenger compartment. In an embodiment, the glass panel assembly may further comprise an electrical connector for an electrical connection to the lighting device such to supply electrical power to the lighting device. For example, the glass panel assembly according to the fourth aspect may be configured to receive a lighting device according to the third aspect of the present invention.

BRIEF DESCRIPTION OF THE DRAWINGS

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings, in which.

DETAILED DESCRIPTION OF THE ILLUSTRATIVE EMBODIMENTS

Aspects of the present invention will now be described with reference to the accompanying drawings, wherein the same reference numerals have been used to identify the same or similar elements throughout the several views.

Figure 1A:
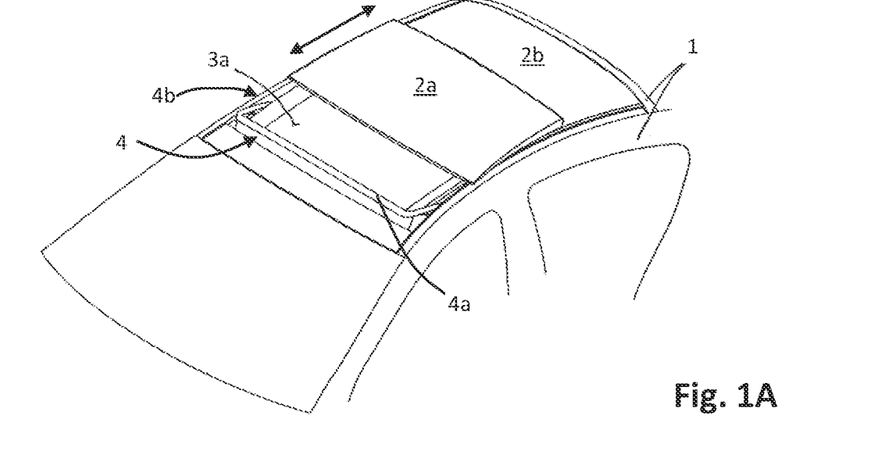
FIG. 1A shows a perspective view of a vehicle roof with an open roof assembly.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
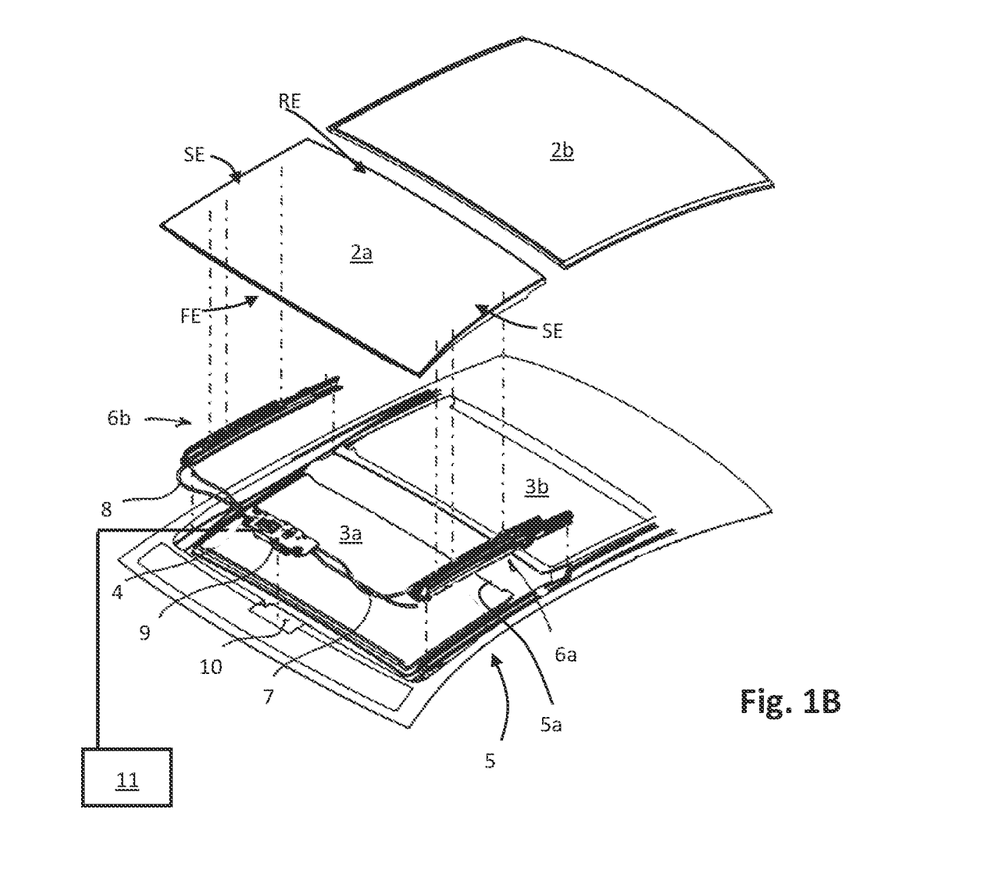
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2A:
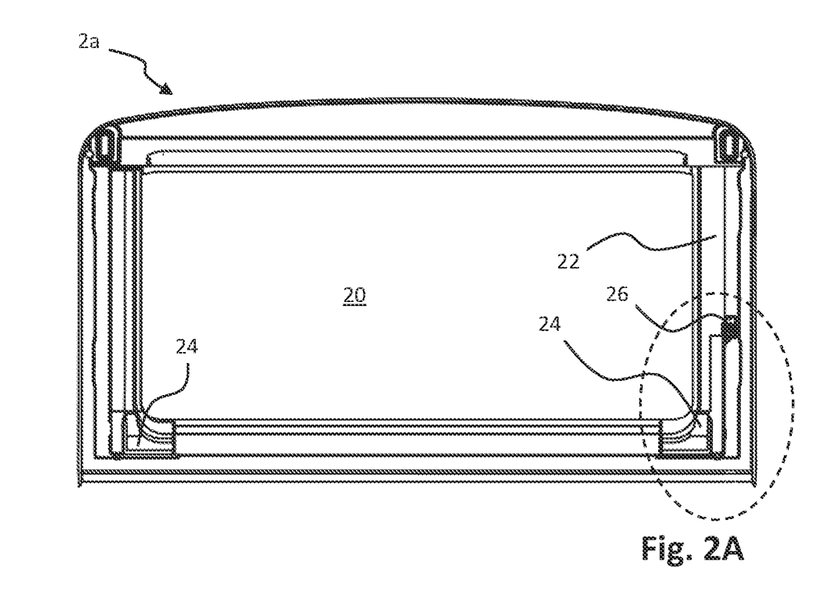
FIG. 2A shows a bottom view of a glass panel for use in a glass panel assembly.

FIG. 2A schematically illustrates a bottom view of a moveably arrangeable glass panel 2a, which view shows an interior main surface 20 of the glass panel 2a. The interior main surface 20 is provided with an adhered frame 22 arranged at a perimeter of the glass panel 2a. For example, the frame 22 may be formed from a polyurethane (PU) foamed or injection moulded composition, which is applied in a liquid state and is cured on the interior main surface 20 of the glass panel 2a. In the PU backing, an element such as a metal frame element may be provided for increasing a stiffness of the glass panel 2a or for mounting elements to the glass panel 2a. Further, the PU backing may be used to provide an aesthetic finish to the glass panel 2a.

It is noted that the present invention is not limited to the use of a PU composition based frame. For example, the PU composition may be alternatively or additionally be composed of another polymer-based and curable composition that is applied and adhered to the glass panel 2a. Additionally or alternatively, the frame 22 may be formed by or comprise a stiff structure, like a metal or plastic structure, as above mentioned. Further, the frame 22 may be formed of a single element, such as the cured PU composition or a stiff and adhered structural element, or may comprise multiple elements either directly coupled to each other or indirectly coupled to each other e.g. through the adherence of the individual elements to the glass panel 2a.

As is elucidated hereinbelow in more detail, a lighting device is coupled to the frame 22. Thereto, a cover part like a plastic cover part 24 may be provided. The cover part 24 may be coupled to the frame 22 and may be configured and arranged to cover an electrical connector for connecting a power supply line to the lighting device.

Figure 2B:
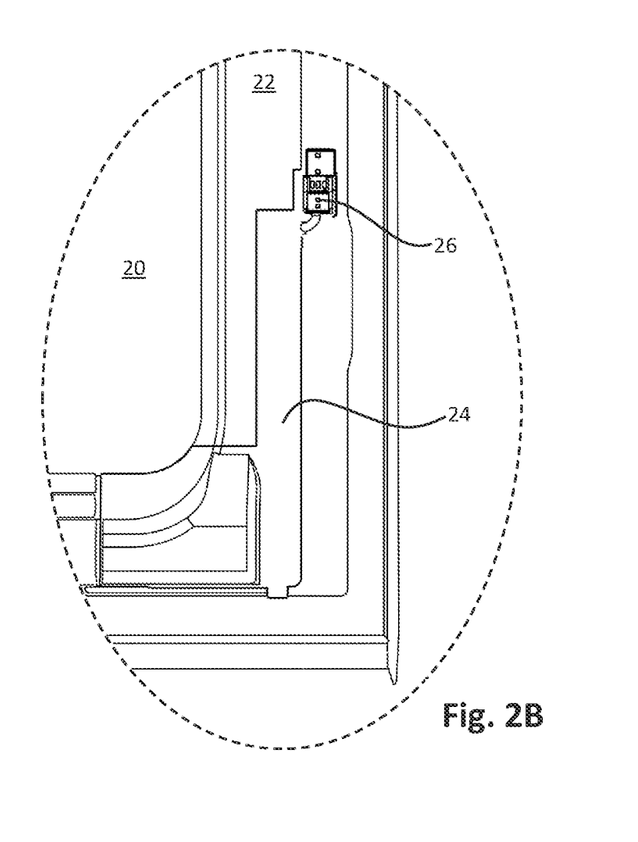
FIG. 2B shows a detailed view of a part of the bottom view of the glass panel of FIG. 2A.

A corner section B of the glass panel 2a is shown in more detail in FIG. 2B. In the corner section, the cover part 24 is provided. Between the cover part 24 and the glass panel 2a, a PU backing may have been omitted to provide for a space for an electrical connection to the lighting device. A panel connector 26 may be arranged on top of the frame 22, with an electrically conductive wiring to the electrical connector covered by the cover part 24. The panel connector 26 may be configured to connect to an electrically conductive wiring coupled to a body of a vehicle for receiving electrical power from a vehicle battery, for example. Similarly, control signals may be provided for controlling a lighting effect of the lighting device, if the lighting device supports multiple lighting effects. It is apparent to those skilled in the art that an electrical connection may be provided for many purposes and further elaboration of optional electrical connections is therefore further omitted herein. Further, it is contemplated that the panel connector 26 is directly connected to the lighting device such that the cover part 24 merely covers a channel for an electrical wiring between the panel connector 26 and the lighting device.

Figure 3A:
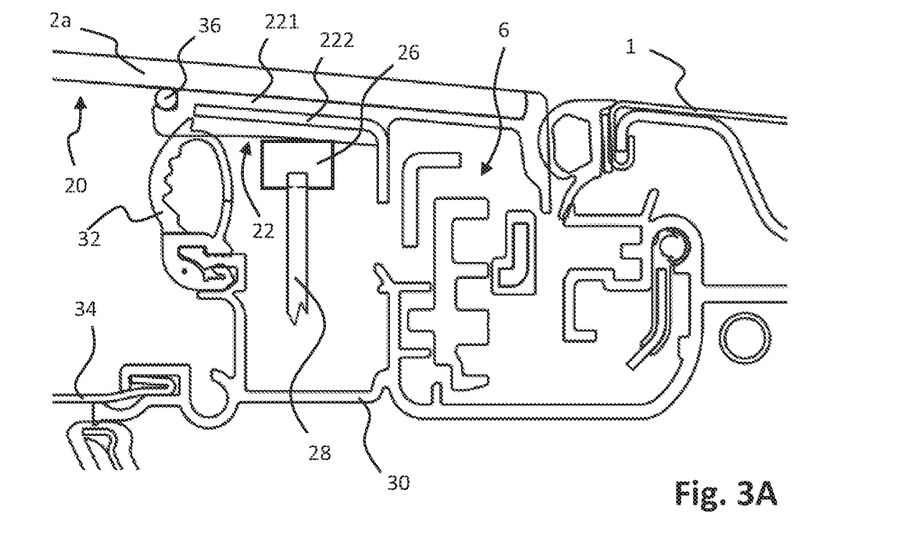
FIG. 3A shows a cross-section of a first embodiment of a glass panel assembly.

FIG. 3A illustrates a guide assembly 6 mounted in a vehicle roof 1. The moveably arranged glass panel 2a is substantially flush with the vehicle roof 1 and is supported by the guide assembly 6. The guide assembly 6 is arranged in and coupled to a guide 30, which guide frame 30 is coupled to a body of the vehicle. On the interior main surface 20 of the glass panel 2a, the frame 22 is attached, wherein the frame 22 comprises a cured PU based composition 221 and a rigid support element 222, e.g. a metal frame element. An acoustic seal 32 is arranged between the guide frame 30 and the frame 22. A flexible sunshade web 34 is supported and guided by the guide frame 30.

Figure 3B:
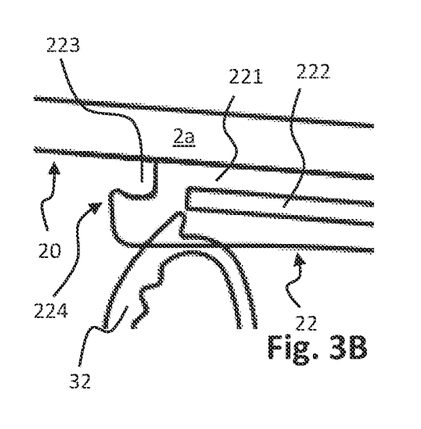
FIG. 3B shows a detailed view of a part of the cross-sectional view of FIG. 3A.
Figure 3C:
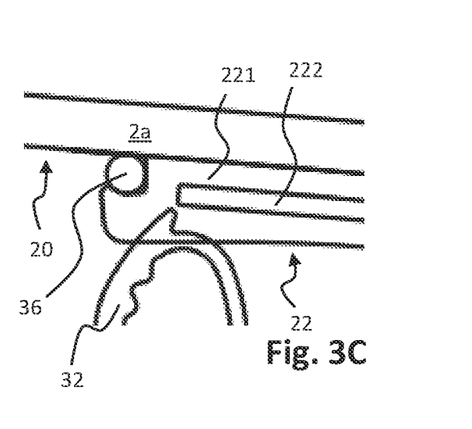
FIG. 3C shows a detailed view of a part of the cross-sectional view of FIG. 3A.

Referring to FIGS. 3A-3C, a lighting device 36 is arranged in a shaped element, in particular a recess 223, of the frame 22. The recess 223 is suitably formed in the cured polymer-based PU composition 221. Manufacturing steps for providing a cured polymer-based composition 221 with a shaped element, in particular the recess 223, are known in the art and are not further elucidated herein.

FIG. 3B illustrates the frame 22 with the recess 223 as manufactured. In accordance with an aspect of the present invention, during the manufacturing, the lighting device 36 is not present and thus is not subjected to potential damage like surface scratches, or the like, that would significantly deteriorate the appearance of the illumination in the vehicle.

The shaped element comprises the recess 223 and further comprises a retaining portion 224. The retaining portion 224 is formed by the polymer-based composition 221 and provides for a narrowed opening to the recess 223. The retaining portion 224 has a predetermined flexibility allowing to push a mating shape of a lighting device into the recess 223 after which the mating shape is mechanically retained in the recess 223 by the retaining portion 224.

As illustrated in FIG. 3C, the lighting device 36 comprises a cylindrically shaped light conductive element, such as a light guide. The light guide 36 may be a single light-conductive rod or may be a bundle of light guiding rods in a flexible sleeve or may be embodied in any other suitable shape or form. If the cross-sectional shape of the light conductive element is not circular, the cross-sectional shape of the recess 223 may be adapted to such shape of the light conductive element, although the cross-sectional shapes of the light conductive element 36 and of the recess 223 are not required to be identical. Functionally it is preferred that the light conductive element 36 may easily be pushed into the recess 223 such that light is coupled out, preferably uniformly, through the opening to the passenger compartment of the vehicle, while the light conductive element 36 is mechanically retained in the recess 223.

Returning to FIG. 3A, the panel connector 26 is arranged in a void space that is not visible from the passenger compartment of the vehicle. An electrical wiring 28 is provided for the electrical connection to a power supply, for example, as above described and as further elucidated hereinbelow with reference to FIGS. 8A and 8B.

In the first embodiment of FIGS. 3A-3C, the lighting device 36 is arranged between the frame 22 and the glass panel 2a. While the lighting device 36 is arranged such that a substantial portion of the emitted light directly illuminates the passenger compartment, another portion of the emitted light may pass through the glass panel 2a. To prevent light shining through the glass panel 2a, a coating or other similar layer (not shown), preferably a reflective coating or layer, may optionally be provided on the interior main surface 20 to reflect any light emitted in the direction of the interior main surface 20 into the passenger compartment of the vehicle. As known in the art, if the glass panel 2a is a multilayer panel, such a coating or layer may be provided at an interlayer of the multilayer panel instead of at the interior main surface 20.

Further, as known in the art, applying the liquid polymer-based composition on the interior main surface 20 during manufacturing may result in a very thin layer of the composition forming an uneven edge at the glass panel 2a. Such a thin layer commonly is cut away after curing. Such cutting is an additional manufacturing step, which adds costs and consumes time. In the first embodiment, such a thin layer at the edge will be arranged in the recess 223 and will not be visible after mounting the lighting device 36. Hence, a manufacturing step may be omitted, thereby reducing costs.

Figure 4:
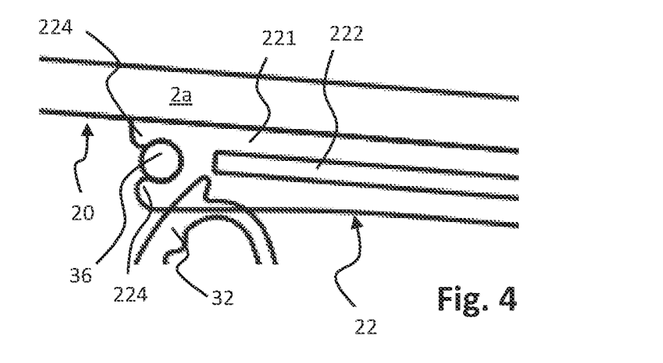
FIG. 4 shows a cross-sectional view of a second embodiment of a glass panel assembly.

FIG. 4 illustrates a second embodiment, wherein the lighting device 36 is arranged in a recess in the frame 22. Compared to the first embodiment of FIGS. 3A-3C, the recess is formed completely in and by the cured polymer-based composition 221 and not by the interior main surface 20. In accordance with an aspect of the present invention, the recess is formed during manufacturing of the frame 22 and the lighting device 36 is arranged in the recess in a later manufacturing step.

Figure 5:
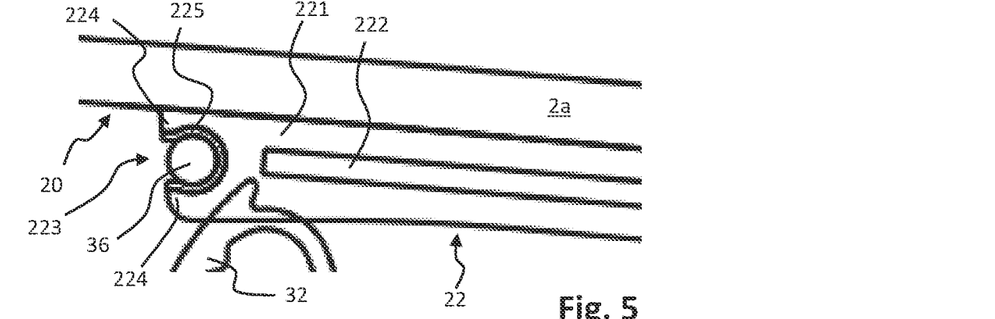
FIG. 5 shows a cross-sectional view of a third embodiment of a glass panel assembly.

FIG. 5 shows a third embodiment, wherein a reflective layer 225 is provided in the recess 223. The reflective layer 225 may be provided to improve an amount of light output to the passenger compartment of the vehicle, as the reflective layer 225 may prevent light being absorbed in the cured polymer-based composition 221 of the frame 22. The reflective layer 225 may be a coating or may be a physical layer arranged in the recess 223, e.g. adhered by a suitable adhesive, or the like, after manufacturing the recess 223 in the cured composition 221.

Figure 6:
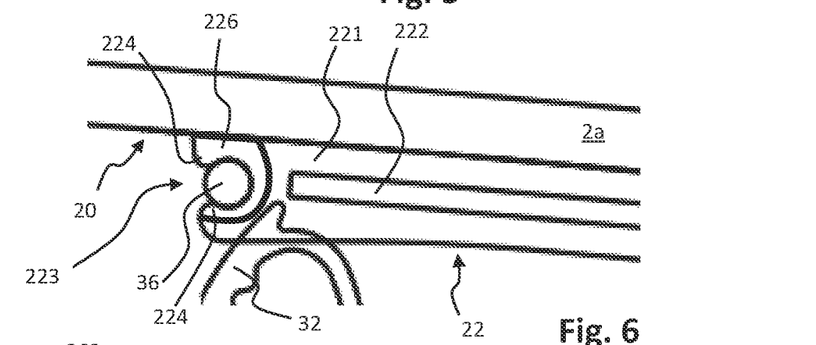
FIG. 6 shows a cross-sectional view of a fourth embodiment of a glass panel assembly.

In a fourth embodiment as shown in FIG. 6, the recess 223 is provided in an elongate rigid support element 226, e.g. an extruded aluminium structure. The elongate rigid support element 226 may be first adhered to the interior main surface 20 of the glass panel 2a, e.g. by an adhesive or a tape, and then the polymer composition 221 is applied. In an embodiment, the rigid support element 226 may be combined with the rigid support element 222 or there may be two rigid support elements 222, 226 as shown. In another embodiment, the first rigid support element 222 may be omitted.

The elongate rigid support element 226 provides not only the recess 223, but also provides the retaining portion 224 and may provide for a reflective inner surface of the recess 223 by suitable selection of the material of the elongate rigid support element 226 or by application of a reflective coating or any other suitable layer (cf. reflective layer 225 in the third embodiment).

Figure 7A:
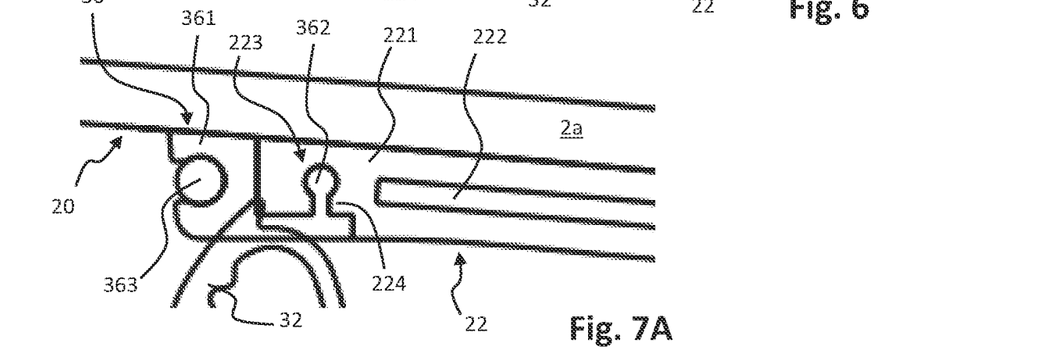
FIG. 7A shows a cross-sectional view of a fifth embodiment of a glass panel assembly.

FIG. 7A illustrates a fifth embodiment, in which a carrier 361, a coupling element 362 and a lighting element 363 together form a lighting device 36. The carrier 361 may be a metal or plastic element, for example, with a desired aesthetic look for a desired finish. The carrier 361 is provided with the coupling element 362, which has the mating shape for coupling to the shaped element, i.e. recess 223, of the frame 22. An opening to the recess 223 is narrowed by a suitable retaining portion 224 such to retain the coupling element 362 in the recess 223. Further, the carrier 361 supports and holds the lighting element 363, which may be a light conductive element as shown in combination with the first to fourth embodiments and as shown in FIG. 7A.

The lighting device 36 as used in the fifth embodiment is applied after the frame 22 has been provided on the interior main surface 20 of the glass panel 2a. The coupling element 362 may then be pushed into the recess 223 for coupling to the lighting device 36 to the frame 22. Additionally, further shaped elements, like a recess or a protrusion, may be provided for a further coupling between the lighting device 36 and the frame 22 of the fifth embodiment. Also additionally, the carrier 361 may also be adhered to the interior main surface 20, e.g. to prevent vibration against the interior main surface 20 which could lead to noise during normal operational conditions, i.e. during driving.

In the embodiment illustrated in FIG. 7A, the coupling element 362 is pushed in the recess 223 of the frame 22 in a direction substantially perpendicular to the interior main surface 20. In normal operational conditions, this direction of coupling corresponds to a direction of gravity. Therefore, the shape of the shaped element 223 and the mating shape of the coupling element 362 need to be designed such that forces of gravity and inertia can be sufficiently counteracted in order to retain the coupling element 362 in the recess 223. In another embodiment, the direction of coupling may be in another direction, e.g. substantially perpendicular to the direction of gravity and/or a direction substantially parallel to the interior main surface 20, which may alleviate a retaining force requirement.

Figure 7B:
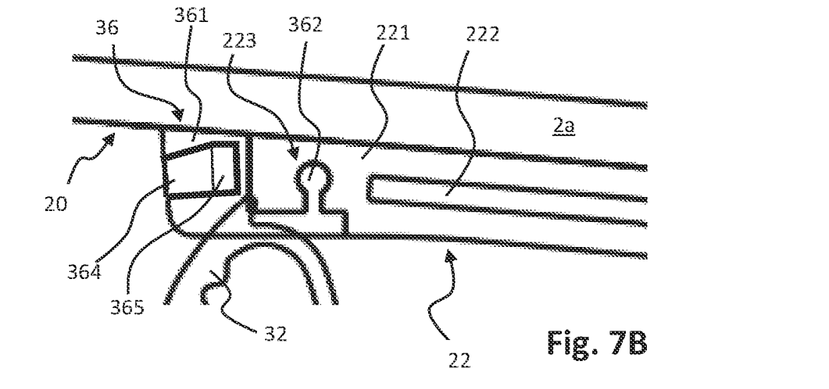
FIG. 7B shows a cross-sectional view of a sixth embodiment of a glass panel assembly.

FIG. 7B illustrates a sixth embodiment, which is similar to the fifth embodiment except for the lighting element 363. In the sixth embodiment, a light diffusing element 364 is arranged between a light source 365 and the passenger compartment of the vehicle. In particular, the light source 365 may be an array of light sources such as an elongated strip with a row of LED's arranged thereon. The diffusing element 364 may be provided to spread the light from the LED's such to obfuscate the individual LED light sources and generate a perception of a single elongated light source, as known in the art.

Figure 8A:
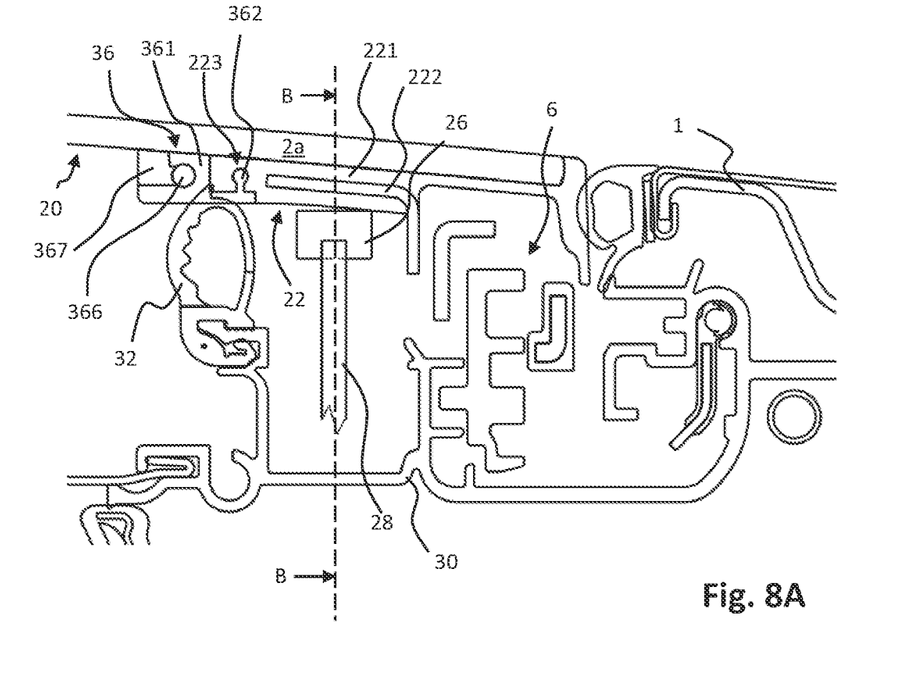
FIG. 8A shows a cross-sectional view of a seventh embodiment of a glass panel assembly.

A seventh embodiment is illustrated in FIG. 8A. In the seventh embodiment, the lighting device 36 comprises the carrier 361 and the coupling element 362 similar to the fifth and sixth embodiments. The lighting element used in the seventh embodiment comprises a light conductive element 366 such as a light guide as described in relation to the first to fifth embodiments. Further, an optical element 367 is provided. The optical element 367 may be a clear transparent element, a lens element, a diffusing element, a light conductive element, or the like. Further, the optical element 367 may have one or more reflecting surfaces. For example, as illustrated, one surface of the optical element 367 is arranged parallel to and against the interior main surface 20. To prevent inadvertent light loss, such surface of the optical element 367 may be provided with a reflective coating. Depending on the particular embodiment, the optical element 367 may also be provided with surfaces arranged such to provide for total internal reflection for preventing light loss and/or directing light in a desired direction. Essentially, any optical feature or measure may be embodied in the optical element 367.

Figure 8B:
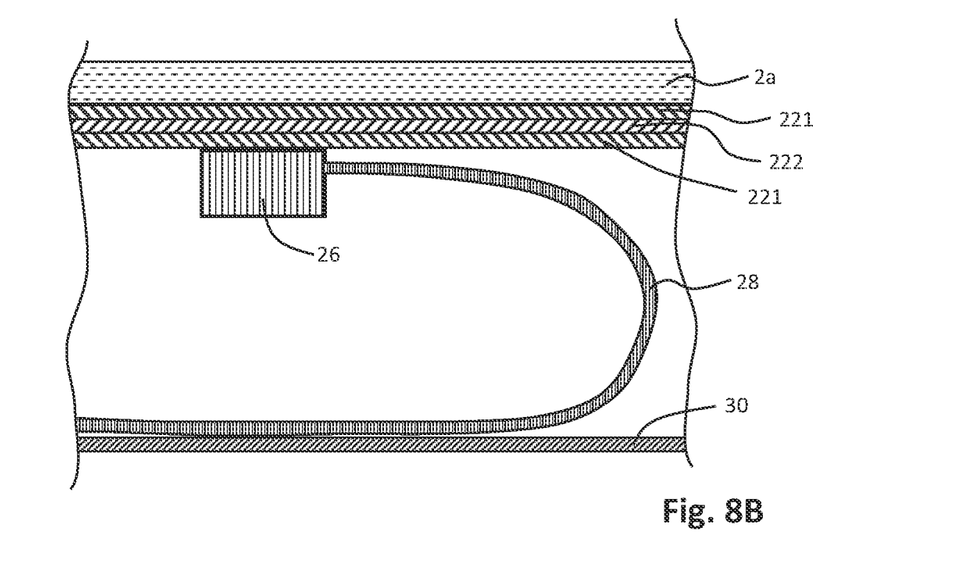
FIG. 8B shows a further cross-sectional view of the seventh embodiment along line B—B as shown in FIG. 8A.

Further, FIG. 8A shows the panel connector 26 and the electrical wiring 28 similar to the panel connector 26 and the electrical wiring 28 of the first embodiment as shown in FIG. 3A. FIG. 8B shows a further cross-sectional view along line B-B as indicated in FIG. 8A.

In FIG. 8B, the glass panel 2a, the cured polymer composition 221, the rigid support element 222, the panel connector 26, the electrical wiring 28 and the guide frame 30 are shown. As apparent, the electrical wiring 28 is shown in a relatively large bend. Thus, the electrical wiring 28 is free to move with the glass panel 2a. The glass panel 2a is moveably arranged as described in relation to and shown in FIG. 1A, although the present invention may be employed in combination with a fixed panel as well. When the glass panel 2a is moved, the electrical wiring 28 needs to be able to follow the glass panel 2a and should not obstruct such movement. Applying a flexible electrical wiring 28 in a large bend is known as a suitable embodiment for allowing a movement of a moveable element while maintaining the electrical connection. Moreover, in an embodiment, a flexible cable carrier, like a chained cable carrier, may be used to guide the movement of the electrical wiring. A person skilled in the art is believed to be able to design a suitable electrical wiring connection allowing the glass panel 2a to move over its predetermined range.

In another embodiment, a releasable connection may be provided such that, when the moveable panel is in its position of closing an opening in the roof of the vehicle, the electrical connection is established for supplying electrical power, or the like. When the moveable panel moves to an open position, the electrical connection may be released. As soon as the glass panel moves to an open position, the lighting device is moved from its original position. It may be considered that the lighting device cannot illuminate a passenger compartment of the vehicle in such an open position and, therefore, the power supply may be cut off.

In a more particular embodiment, the releasable connection may be provided, while a power storage like a rechargeable battery, or the like, may be provided on the glass panel and connected to the lighting device such that upon cutting off the power supply the battery may supply power to the lighting device, while upon restoring the power supply connection the battery may be recharged.

It is noted that, for sake of brevity, certain aspects and alternative embodiments have been described in the scope of one or more of the first to seventh embodiments, but not for each and every embodiment. It will be apparent to those skilled in the art that such aspects and alternatives described in relation to one embodiment may be combined with one or more of the other embodiments. Such combinations are herewith disclosed.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A glass panel assembly for use in a roof of a vehicle, the glass panel assembly comprising:
   a glass panel comprising an interior main surface, the interior main surface of the glass panel being configured to be directed to a passenger compartment of the vehicle;
   a frame adhered to the interior main surface, the frame comprising an elongated recess extending between the interior main surface and the frame along a length direction of at least a part of the frame;
   an elongate lighting device mechanically retained at the frame by a mating shape of the elongate lighting device engaging the recess and wherein the lighting device is configured to directly illuminate at least a part of said passenger compartment.

2. The glass panel assembly according to claim 1, wherein the frame is at least partially formed from a cured polymer-based composition.

3. The glass panel assembly according to claim 1, wherein the frame comprises a rigid support element.

4. The glass panel assembly according to claim 3, wherein the rigid support element is embedded in a cured polymer-based composition.

5. The glass panel assembly according to claim 3, wherein the rigid support element comprises an elongated recess and wherein the rigid support element is embedded in the cured polymer-based composition such that the elongated recess is open and forms the elongated recess of the frame.

6. The glass panel assembly according to claim 1, wherein the recess and the mating shape have a corresponding shape to provide for a form-fitting engagement.

7. The glass panel assembly according to claim 1, wherein the elongate lighting device comprises an elongate light guide, the elongate light guide being clamped in the recess.

8. The glass panel assembly according to claim 1, wherein the elongate lighting device comprises a carrier, the carrier comprising a coupling element, the coupling element having the mating shape.

9. The glass panel assembly according to claim 8, wherein the elongate lighting device comprises an array of light sources and a diffusing element arranged between the array of light sources and the passenger compartment of the vehicle.

10. A method of manufacturing a glass panel assembly for use in a roof of a vehicle, the method comprising:
    providing a glass panel comprising an interior main surface, the interior main surface of the glass panel being configured to be directed to a passenger compartment of the vehicle;
    adhering a frame to the interior main surface, the frame comprising an elongated recess extending between the interior main surface and the frame along a length direction of at least a part of the frame;
    providing an elongate lighting device, the lighting device comprising a mating shape;
    engaging the mating shape of the elongate lighting device with the recess to mechanically retain the elongate lighting device at the frame, and wherein the lighting device is configured to directly illuminate at least a part of said passenger compartment.

11. A glass panel assembly for use in a roof of a vehicle, the glass panel assembly comprising:
    a glass panel comprising an interior main surface, the interior main surface of the glass panel being configured to be directed to a passenger compartment of the vehicle;
    a frame adhered to the interior main surface, the frame comprising an elongated recess;
    an elongate lighting device comprising a carrier, the carrier comprising a coupling element, the coupling element comprising a mating shape, wherein the mating shape is engaged with the elongated recess of the frame of the glass panel assembly in a form-fitting manner, the lighting device being configured to directly illuminate at least a part of said passenger compartment.

12. A glass panel assembly for use in a roof of a vehicle, the glass panel assembly comprising:
    a glass panel comprising an interior main surface, the interior main surface of the glass panel being configured to be directed to a passenger compartment of the vehicle;
    a frame adhered to the interior main surface, the frame comprising an elongated recess extending between the interior main surface and the frame along a length, direction of at least a part of the frame, and wherein the recess is configured for engaging a mating shape of an elongate lighting device such to mechanically retain the lighting device at the frame and directly illuminate at least a part of said passenger compartment.

13. The glass panel assembly according to claim 12, wherein the glass panel assembly further comprises an electrical connector for an electrical connection to the lighting device such to supply electrical power to the lighting device.

14. The glass panel assembly according to claim 12, wherein the shaped element is elongated and extends along a length direction of at least a part of the frame.

15. The glass panel assembly according to claim 12, wherein the shaped element and the mating shape have a corresponding shape to provide for a form-fitting engagement.

16. The glass panel assembly according to claim 12, wherein the frame is at least partially formed from a cured polymer-based composition.

17. The glass panel assembly according to claim 12, wherein the frame comprises a rigid support element.

18. The glass panel assembly according to claim 1, wherein a reflective layer is applied on the interior main surface of the glass panel in the elongated recess to reflect light towards the passenger compartment of the vehicle.

* * * * *